United States Patent [19]
Peeples

[11] Patent Number: 5,458,385
[45] Date of Patent: Oct. 17, 1995

[54] DEAD ANIMAL PICK UP TOOL

[76] Inventor: John M. Peeples, 4960 Hwy. E9, Royston, Ga. 30662

[21] Appl. No.: 355,591

[22] Filed: Dec. 14, 1994

[51] Int. Cl.$^6$ ........................................................ B25J 1/00
[52] U.S. Cl. ............................................ 294/19.1; 294/100
[58] Field of Search ............................ 294/11, 19.1, 19.3, 294/16, 22, 50.8, 50.9, 61, 99.1, 100, 118, 902; 119/806, 807; 43/5

[56] References Cited

U.S. PATENT DOCUMENTS

| | | | |
|---|---|---|---|
| 322,070 | 7/1885 | Rutan | 294/19.1 X |
| 923,376 | 6/1909 | Savage | 294/22 |
| 1,489,581 | 4/1924 | Lynch | 294/100 |
| 1,949,452 | 3/1934 | Chadwick | 294/118 |
| 2,193,073 | 3/1940 | Norton | 294/100 |
| 2,429,444 | 10/1947 | Yett | 294/100 |
| 3,208,786 | 9/1965 | Eddleman | 294/19.3 |
| 3,425,734 | 2/1969 | Hollis | 294/19.1 |
| 3,527,492 | 9/1970 | Hollis | 294/19.1 |
| 4,210,353 | 7/1980 | Koontz | 294/19.1 |
| 4,398,759 | 8/1983 | Manola | 294/19.1 X |
| 4,854,626 | 8/1989 | Duke | 294/19.1 |
| 4,962,957 | 10/1990 | Traber | 294/19.1 |

FOREIGN PATENT DOCUMENTS

| | | | |
|---|---|---|---|
| 2081170 | 2/1982 | United Kingdom | 294/19.1 |

Primary Examiner—Johnny D. Cherry
Attorney, Agent, or Firm—Cort Flint; Robert R. Reed

[57] ABSTRACT

There are a number of situations where objects must be picked up and transported to a remote location for future disposal. The hand held grappling tool of this invention is designed to pick up and transport an animal carcass, but can be used for any object. A pair of pickup plates having sharp spikes on their interior surface are each supported on the lower end of a leaf spring. The two leaf springs are attached to the lower end of a hollow tube which has a handle rigidly attached near its upper end. An actuator mechanism comprises a cable attached to the pickup plates adjacent the lower end of each leaf spring and extending upward into the hollow tube to a trigger device. The two cables position the pickup plates to pick up the carcass by displacing the trigger device. A first trigger device distance places the pickup plates in a first position, with a first angular orientation so that the spikes contact the carcass. A second trigger device distance places the pickup plates in a second position, with a second angular orientation for the spikes to penetrate the carcass. The trigger device can be alternated between the first and second distances to help the spikes penetrate the object. The object is transported by one hand on the handle and another hand on the upper end of the hollow tube to provide increased lifting ability and to reduce fatigue on the operator.

13 Claims, 3 Drawing Sheets

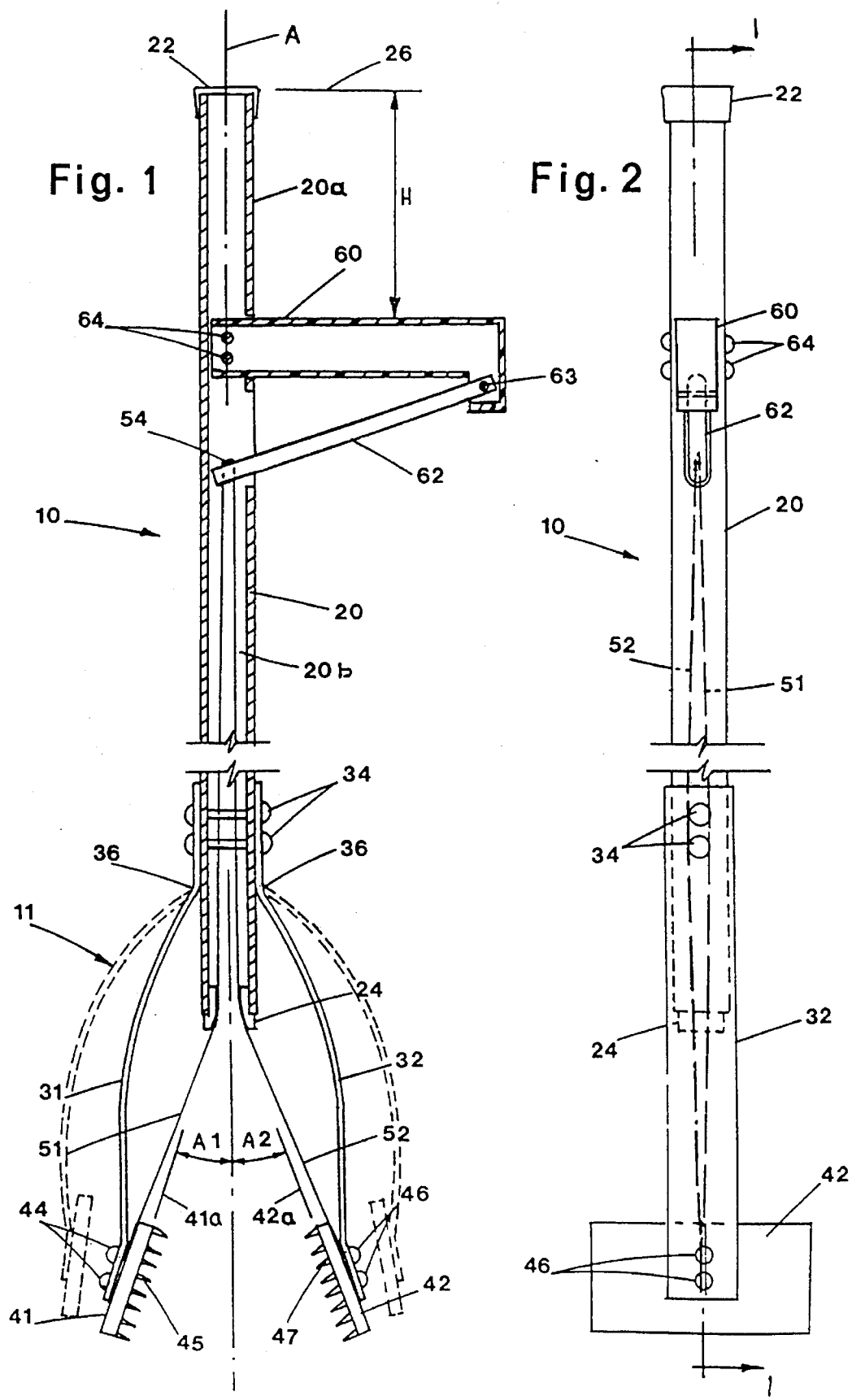

DEAD ANIMAL PICK UP TOOL

BACKGROUND OF THE INVENTION

This invention pertains to the general area of hand held tools and more particularly to a remote pinching device activated by an operator holding and gripping a handle having a trigger. The tool is to be used for manipulating the carcasses of small dead animals apart from the operator, including safely picking up and transporting the animals.

There are numerous situations when the direct use of the hands of a person to pickup and transport objects is unsafe. The safety may be as a result of the person being required to physically exert more force than their ability and strength allow, or it may be the number of times that a person is required to exert an otherwise safe force. Repeated actions often produce fatigue followed by physical strain and over exertion. For example, a typical chicken farm may raise 100,000 chickens over a period of six weeks. With a 10 percent death rate there would be 238 dead chickens to pick up and transport to a future disposal area each day, on the average. Obviously, fatigue may become a problem with the chicken farmer. Safety may also manifest itself in being a danger to the health of a person resulting from the nature of the object. For example, if the objects are dead animals, they can be infested with disease and other dangerous decomposition substances and organisms.

Of particular concern in the pickup and transportation of objects by a remote hand operated tool is the ability to properly grip and hold the object. The use of a roughened inner surface of the jaws or plates contacting the object is commonly known. However, the direct pinching force of these devices is frequently not adequate to hold the object. In U.S. Patent No. 4,210,353 the end pinching device has pointed sharp ends that penetrate the object such that it can be picked up and transported. The pinching device is forced apart by a coil spring near the lower end of the tool. A chain assembly is attached to a handle at the opposite end of an elongated tube of the tool to close the pinching device. The tool operates by a series of linkages with a coil spring to place the pinching device linkages in an open position.

The disclosure of U.S. Pat. No. 322,070 further indicates that the pinching device jaws (plates) which grip the object have a roughened inner surface held against the object (a brush) by means of a slip ring. This tool is also made using a combination of rigid linkages. No device or means for moving said jaws is provided at the remote end of the handle. The operator must approach the object to secure it in place with the slip ring.

A combination of linkages and a coil spring are also components of the litter pickup device of U.S. Pat. No. 4,398,759. A control cable allows the distance between the jaws to be adjusted for various types of objects (litter). The pinching device jaws do not have roughened inner surfaces. The jaws are activated by the control cable being attached to a handle at an upper shaft portion at its end. The upper shaft does not extend beyond the handle.

Other means to position the jaws or plates in an open position prior to grabbing an object are disclosed in U.S. Pat. Nos. 2,429,444; 3,527,492; and 4,962,957. These patents rely on leaf springs at the grabber end of the hand held tool to provide support for the plates that cradle the object to be picked up. In U.S. Pat. No. 2,429,444 the leaf springs are bias closed, but held open by a hinged device. When the toothed graspers or catchers are placed to pick up an object, a rod is lowered to collapse the hinged device and thereby grabbing the object. No handle activating device is provided as this tool is for removing articles from wells using a long rope or cable.

In U.S. Pat. No. 3,527,492 two pair of leaf springs (of a trash pickup device) extend from the lower end of an elongated shaft. One pair of springs is attached to the lower end of the shaft and the other pair extends upward inside the hollow shaft. This other pair of leaf springs is connected by a rod to a trigger lever that pulls these springs further into the shaft when the trigger is gripped by the operator. This action brings the flexible discs, one at the end of each one of the first pair of leaf springs, to grip an object to be picked up and transported. The trigger is part of a bent end portion of the hollow shaft that provides a handle at the upper end of the tool.

The disclosure of U.S. Pat. No. 4,962,957 also describes a tool having two pair of leaf springs, a hollow elongated shaft containing components that attach one inner pair of leaf springs to a handle and a pair of spaced apart pickup fingers at the lower end of the outer pair of leaf springs for grabbing an object. The inner pair of leaf springs are attached to the outer pair of leaf springs to pull the pickup fingers and bias them closed on the object. This tool further includes a locking device to hold the fingers on the object.

The pickup tools of the prior art have a number of shortcomings. When the single hand power of the operator is not sufficient, due to physical limitations and/or fatigue, there is no place to grab the tool with a second hand. The hollow elongated shaft or tube below the handle should be only long enough to reach the object on the ground when the operator's arm is extended. A further problem with the prior art tools exists with the ability to have the spikes or fingers on the plates or jaws contacting the object to penetrate the outer surface of the object and improve the gripping efficiency. This is particularly true with dead chickens which have a layer of feathers which resist the penetration of the spikes or fingers.

There remains a need to have a hand held grappling tool for operation by two hands, if needed. Also, the gripping action of the plates or jaws with spikes or fingers needs to be improved.

Accordingly, the objects of this invention are to overcome the shortcomings of the prior art. The apparatus of this invention has an overall object to be a hand held grappling tool being light in weight and operated from a standing position.

In another object of this invention, the grappling tool is to be used for picking up and transporting the carcasses of small dead animals, such as chickens on a chicken farm. The tool is to maintain a safe distance from the animal to the person operating the tool and be capable of penetrating the animal's protective coating.

A further object of this invention is to provide a grappling tool which can be used by both hands of the operator to limit physical strain and fatigue due to repeated operations.

SUMMARY OF THE INVENTION

The apparatus of this invention is for grasping a carcass or object at ground level by gripping a handle and trigger device so that the object can be picked up and transported. Safety of the operator is maintained by providing a means for future disposal by manipulating the object without physical contact. For the purpose of this invention the hand held apparatus is called a grappling tool.

The grappling tool comprises an elongated hollow tube having a guide device at a lower end and a cap device at an upper end. A pair of bent leaf springs are rigidly attached at their upper end to the tube above the guide at the lower end of the tube. The two springs are on opposite sides of the tube and are symmetrically positioned with respect to a centerline of the tube. A pickup plate is rigidly attached to the lower end of each one of the pair of leaf springs. The pickup plates have an interior surface at an angular orientation from the centerline of the tube. Each plate has sharp spikes or fingers extending from their interior surface in a direction toward the centerline of the tube. A pair of cables is included as components of the tool. Each cable is attached at its lower cable end to a pickup plate adjacent the lower end of a respective spring, and extends through the guide device into the hollow tube.

A handle is rigidly attached to the upper portion of the hollow tube. The handle is preferably positioned at least a hand grip distance from the upper end of the tube so that the tube can be held by an operator of the tool at the upper end of the tube. An actuator mechanism is included for moving the pickup plates so that they can make contact with the object. A displacement of the actuator mechanism changes the angular orientation and position of the plates to provide a gripping action by the pickup plates on the object. The actuator mechanism includes having the pair of cables attached to a trigger device which is rotatably attached to the handle. The trigger device is displaced a first distance to bring the spikes of the pickup plates in contact with the carcass or object at a first angular orientation and position. A further second displacement of the trigger increases the gripping force and changes the angular orientation of the plates having spikes. The holding ability of the tool is thereby improved.

In another embodiment of the invention a method is provided for picking up and transporting a carcass or object using a hollow tube, a pair of pickup plates, a pair of cables, a trigger device, and a pair of leaf springs as essential components of a hand held grappling tool. The method comprises a first step of positioning the tool such that each one of the pair of pickup plates, having sharp spikes extending inward, is positioned on a side of said carcass; wherein one plate is on one side and the other plate is on an opposite side. In a second step the plates are moved inward toward a centerline of the tool by gripping a handle having a trigger device such that the spikes contact the carcass and provide a gripping force. The trigger moves a first distance to provide a first angular orientation of the plates with respect to a centerline of the tool.

In a third step of the method, the trigger is depressed a second distance to increase the gripping force and to change the first angular orientation to a second angular orientation. The fourth step is to release the trigger to once again obtain the first angular orientation of the plates. In step five, the method repeats the third and fourth steps until the spikes penetrate an outer protective layer of said carcass and allows the carcass to be picked up. In a final step, the carcass is transported by using both the handle and an upper portion of the hollow tube to lift and carry the carcass. The upper portion of the tube preferably is at least a hand grip distance from an upper end of the end cap of the tube to the handle.

A further embodiment of this invention includes the functional operation of the tool when the tool is activated. The leaf springs have a first position when said tool is activated by moving said trigger the first distance to bring said plates with spikes in contact with the carcass at a first angular orientation, with respect to a centerline of the tube. The leaf springs have a second position when said tool is activated by further moving said trigger the second distance to increase the gripping force of said plates with spikes and to change the angular orientation of said plates with spikes from the centerline. The holding ability of the tool is improved and the carcass can be transported using one hand on the handle and the other hand on the tube. The two positions of the leaf springs are cycled to work the spikes on the plates into the carcass.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 1 is a side view of the tool of this invention showing the hollow tube and handle device along section 1-1, as shown in FIG. 2;

FIG. 2 is a frontal view of the tool of this invention as viewed by an operator;

DESCRIPTION OF A PREFERRED EMBODIMENT

Figure 3:
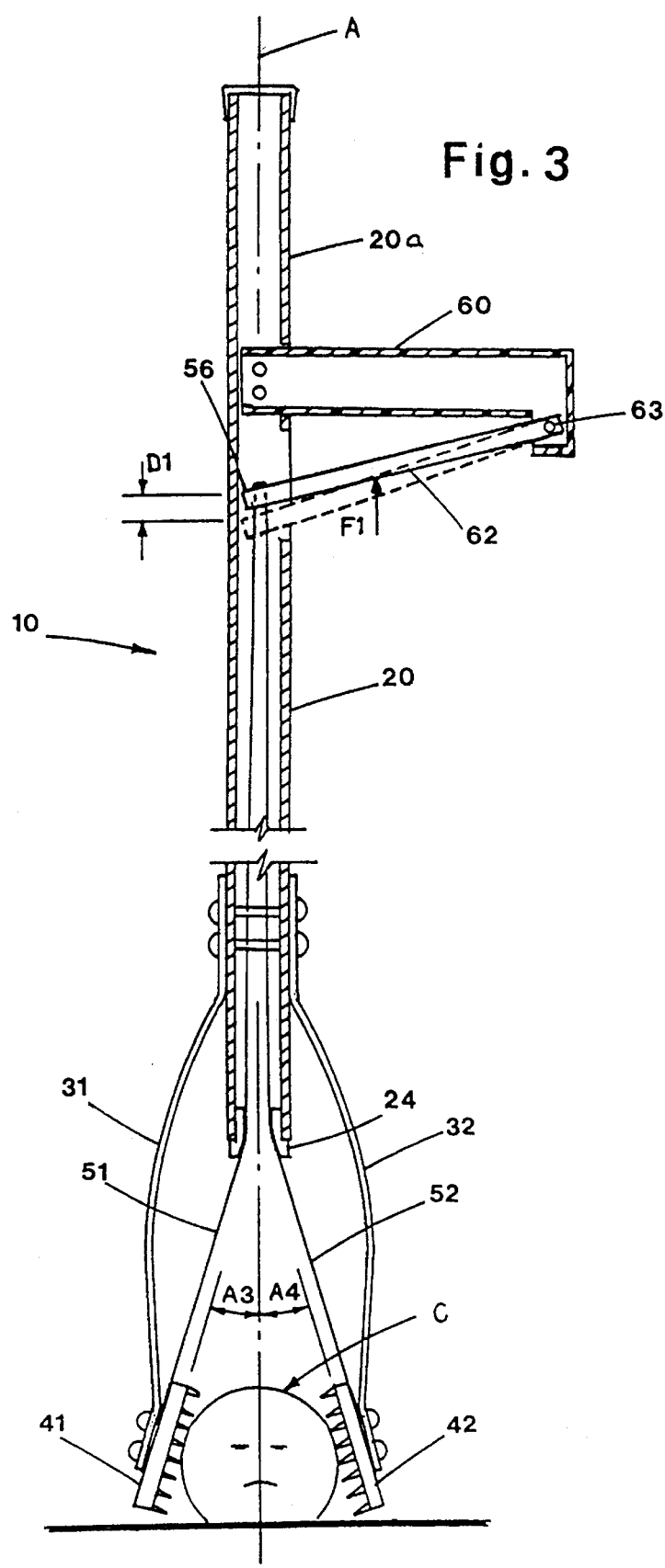
FIG. 3 is a side view of the tool of this invention with spikes of pickup plates in contact with an object.

Referring now in more detail to the drawings, the invention will now be described in more detail.

The preferred embodiment of this invention is shown in FIGS. 1-4 of this application. The pickup tool is shown during various stages of operation with like elements being identified by like numbers in the four figures. The tool 10 of FIGS. 1 and 2 illustrates the position of various components in the relaxed state, prior to the tool being operated to pickup and transport an object. The elongated hollow tube 20 is the primary structural component of the tool 10. The pair of bent leaf springs 31 and 32 support the pickup plates 41 and 42 respectively on opposite sides of the hollow shaft 20. Plate attachments 44 and 46 fix the pickup plates to the leaf springs 41 and 42 respectively. Pickup plates have sharp spikes or fingers 45, 47 extending from the inside face of each pickup plate. Cable 51 is attached to pickup plate 41 and cable 52 is attached to pickup plate 42. Both cables 51 and 52 extend through a guide device 24 at the lower end of the hollow tube 20 and upward into an interior space 20b within the hollow tube. The cables 51, 52 have an upper end attached to a trigger device 62 which is turn is rotatably attached to a handle 60 at attachment point 63.

Cables 51, 52 are attached to the trigger device 62 at a location point 54 within the interior space 20b of the hollow tube 20. Handle 60 is rigidly attached by fasteners 64 to the hollow tube 20 at a distance H below the top end 26 of the hollow tube cap device 22. The leaf springs 31, 32 are fixed to the hollow tube 20 by attachment devices 34 near the lower end of the hollow tube above the guide device 24. The starting position of the pickup plates 41 and 42 can be altered by bending the leaf springs at a bend point 36 to assume an alternate configuration 11.

The leaf springs 31, 32 are positioned on opposite sides of the hollow shaft 20, being symmetrical with respect to a centerline axis A of the tool 10. The leaf springs have a curvilinear shape to bias the pickup plates 41, 42 apart a distance sufficient for an object to be positioned between these pickup plates. Extension plane 41a from the interior surface of pickup plate 41 makes an angle A1 from the centerline axis A, and extension plane 42a from the interior surface of pickup plate 42 makes an angle A2 from the centerline axis A. Preferably angles A1 and A2 are equal and have a value less than about 30 degrees. The position shown in FIGS. 1 and 2 is when the apparatus is relaxed. That is, no force is being applied to the trigger 62 that forces the pickup plates 41, 42 together. The cables 51 and 52 have an initial tension sufficient to hold the leaf springs 31 and 32 in a semi-rigid position for storage and prior to the apparatus being operated.

The grappling tool 10 is placed into use by placing the pickup plates 41, 42 such that a plate is on each side of the object C, as illustrated in FIG. 3. The apparatus is held by the handle 60 in one hand such that the operator grips the handle 60 and the trigger device 62. An initial force F1 is placed on the trigger 62 by the operator and the trigger end 56 is displaced a distance D1, as it rotates about the attachment point 63. The displacement distance D1 moves the cables 51 and 52, pulling them further inside the hollow tube 20 at the guide device 24. Displacement distance D1 is sufficient to bring the spikes or fingers on the pickup plates 41 and 42 in contact with the object C to be picked up. The angles that the pickup plates 41 and 42 make with the centerline axis A have been reduced from angles A1 and A2 to angles A3 and A4 respectively. The pickup plates rotate when the trigger portion 62 pulls the cables 51 and 52, which are attached to the pickup plates. This is a result of changing the radius of curvature of both leaf springs 31 and 32 as the pickup plates are pulled closer to the guide device 24.

The force F1 on the trigger device 62 of FIG. 3 may be sufficient to allow the object C to be picked up. The pickup and transporting of the object is realized by the operator placing a second hand on the hollow shaft 20 at an upper hand grip portion 20a. This two-hand pickup and transport method allows better control, more available strength and less fatigue during the pickup and transportation of a plurality of objects, such as dead animals. Overall safety of the picking up and transporting method is improved. The two-hand operation is preferred for all trigger device forces.

Figure 4:
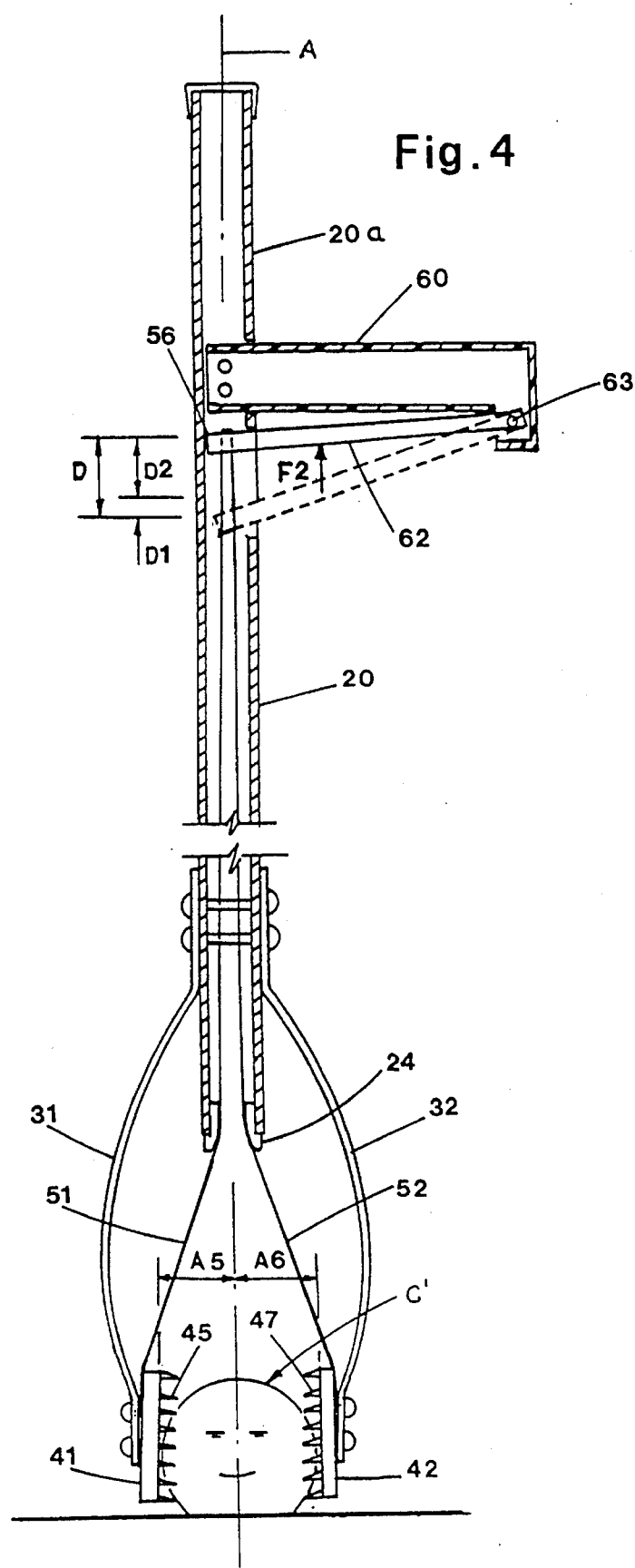
FIG. 4 is a side view of the tool of this invention with the object fully gripped and ready to be picked up.

For many objects, the force F1 on the trigger device 62, illustrated in FIG. 3, is not sufficient for adequately gripping the object. Additional forces are required to penetrate the outer layer of an object. The increase of the force F1 on the trigger device 62 to a greater force F2 is illustrated in FIG. 4. The cables 51 and 52 are further pulled into the interior space 20b of the hollow tube 20 as the trigger device is displaced a second distance D2 at the trigger end 56. The second distance D2 has a preferred value in the range of about 1.0 inch to about 1.5 inches. The pickup plates 41 and 42 move closer to the guide device 24 and the leaf springs 31 and 32 are further deflected and bent into a smaller radius of curvature, resulting in a larger gripping force on an object C'.

An additional gripping action is present as the pickup plates are further rotated as the force is increased on the trigger device 62 and the leaf springs 31 and 32 are bent an additional amount. As illustrated in FIG. 4, the pickup plates 41 and 42 can become approximately parallel when angles A5 and A6 are near zero. The sharp spikes or fingers 45 and 47 also rotate, as they are fixed to plates 41 and 42. Therefore, the spikes are not pushed directly into the object C' but are pushed and rotated at the same time. This double action helps penetrate the outer layer of the object C' and give increased penetration and gripping ability for the grappling tool 10 of this invention. This is particularly useful for the application of the tool with dead chickens having feathers. The preferred length of the spikes or fingers 45 and 47, extending from the interior surface of the plates 41 and 42, is a value in the range of about ⅛ inch to about 5/16 inch.

The method for picking up and transporting a small dead animal is further enhanced by the ability to alternate the trigger force between values F1 and F2. This action will repeatably rotate the spikes or fingers 45 and 47 in one direction and then the opposite direction and allow them to work their way into the object's protective layer or thick skin. The added penetration of the object by the spikes or fingers allows the object to be picked up with less gripping action and more of a penetration action by the tool.

While a preferred embodiment of the invention has been described using specific terms, such description is for illustrative purposes only, and it is to be understood that changes and variations may be made without departing from the spirit or scope of the following claims.

What is claimed is:

1. A hand held grappling tool for picking up and transporting a carcass or object for future disposal comprising:

an elongated hollow tube having a guide device at a lower end;

a pair of deformable leaf springs rigidly attached at their upper end to said tube at a location on said tube above said guide device at said lower end, said pair of springs being on opposite sides of said tube and symmetrically positioned with respect to a centerline of said tube;

a generally rigid pickup plate attached to the lower end of each one of said pair of leaf springs having an interior surface at a predetermined angular orientation from the centerline of said tube, said plates each having sharp spikes extending from said surface of the pickup plates in a direction toward the centerline of said tube to at least partially penetrate said object;

a pair of thin flexible cables each attached at a lower cable end to a respective plate at a location adjacent to the lower end of a respective spring that extend through the guide device into said hollow tube;

a handle rigidly attached to the upper portion of said hollow tube, said handle being positioned to provide at least a hand grip near said upper end of said hollow tube such that said tube can be held by an operator of said tool near the upper end of said tube in addition to the handle; and an actuator mechanism associated with said handle and connected to said pair of cables for moving said pickup plates to make contact with said object such that a displacement of said actuator mechanism actuates said cables to change the angular orientation and the position of said plates to provide a gripping and penetrating action by said pickup plates and sharp spikes respectively on said object for pickup and transportation.

2. The grappling tool set forth in claim 1, wherein the actuator mechanism includes said pair of cables operationally attached to a trigger device being rotatably attached to said handle, whereby said trigger device is displaced a first distance to bring said spikes of said pickup plates in contact with said carcass or object at a first angular orientation and position and a further second distance to enhance the penetration by changing the angular orientation of said plates.

3. The grappling tool set forth in claim 2, wherein the second distance has a value in the range of about 1.0 inch to about 1.5 inches.

4. The grappling tool set forth in claim 1, wherein the carcass is that of a young chicken with feathers and said sharp spikes extend from said surface of the plate a distance in the range of about ⅛ inch to about 5/16 inch.

5. A method for picking up and transporting an object such as a carcass using a hollow tube, a pair of pickup plates including sharp spikes extending inward, a pair of cables, a trigger device and a pair of leaf springs as essential components of a hand held grappling tool, comprising the steps of:
  a) positioning said tool such that each one of the pair of pickup plates is positioned on a side of said carcass being one plate on one side and the other plate on an opposite side;
  b) moving said plates inward toward a centerline of said tool by gripping a handle having the trigger device such that said spikes contact said object and provide a gripping force, depressing said trigger device a first distance to provide a first angular orientation of said plates with respect to a centerline of said tool;
  c) depressing said trigger device a second distance to increase said gripping force wherein said first angular orientation of said plates is changed to a second angular orientation;
  d) releasing said trigger device the second distance to once again obtain the first angular orientation of said plates;
  e) repeating said steps (c) and (d) until said spikes penetrate an outer protective layer of said carcass and allow said carcass to be picked up; and
  f) transporting said carcass by using both said handle and an upper portion of said hollow tube to lift and carry said carcass, said handle being positioned to provide at least a hand grip at said upper end portion of said tube.

6. The method set forth in claim 5 wherein the step of moving said plates further includes using two cables, wherein each cable is attached at one cable end to a respective pickup plate adjacent the lower end of a respective leaf spring and at the other cable end is operatively attached to said trigger device to comprise an actuator mechanism.

7. The method set forth in claim 5 including the step of selecting the second distance to have a value in the range of about 1.0 inch to about 1.5 inches.

8. The method set forth in claim 5 including the step of providing said sharp spikes that extend from an interior surface of said plate a distance in the range of about ⅛ inch to about 5/16 inch, wherein the carcass is that of a young chicken with feathers.

9. A hand held grappling tool for picking up and transporting an object such as a carcass for future disposal comprising:
  an elongated hollow tube;
  a pair of deformable leaf springs rigidly attached at their upper end to a lower end of said tube, said leaf springs symmetrically positioned on opposite sides of said tube;
  a generally rigid pickup plate at the lower end of each said spring having a gripping surface to contact said object when said tool is activated;
  a pair of thin flexible cables each attached at one end to a respective pickup plate adjacent to the lower end of a respective spring;
  a handle carried by said tube for partially holding said elongated tube;
  an actuator mechanism carried by said handle and connected operationally to said flexible cables for moving said plates inwardly towards a centerline of said tube so that said plates apply a gripping action to said object;
  said actuator mechanism having a first position in which said plates are brought into contact with said object at a first angular orientation with respect to said centerline of said tube; and
  said actuator mechanism having at least a second position in which the centerline angular orientation of said plates is changed with respect to said centerline, so that a further and additional gripping action of said plates against said object and penetration are provided to enhance the holding ability of the tool for picking up and transporting said object.

10. The grappling tool set forth in claim 9 wherein said actuator mechanism includes a trigger attached to said cables which is moved a first distance in moving said plates to said first position and which is moved a second distance in moving said plates to said second position, said second distance has a value in the range of about 1.0 inch to about 1.5 inches.

11. The grappling tool set forth in claim 9 wherein the carcass is of a fowl with feathers and said gripping surface includes a plurality of spikes extending from said plates a distance in the range of about ⅛ inch to about 5/16 inch.

12. The grappling tool of claim 9, wherein said deformable leaf springs include an initial curvature to place the pickup plates at a predetermined initial distance from one another and at a predetermined initial angular orientation relative to each other prior to said actuator being in said first position, wherein said deformable leaf springs and flexible cables are constructed and arranged so that said curvature may be changed by bending said springs by hand to change at least one of said initial distance and said initial angular orienation to allow gripping of objects of different size.

13. The grappling tool as set forth in claim 1, wherein said handle held by a first hand is positioned at least a hand grip distance from said upper end of said hollow tube such that a second hand in a position above said handle helps to support the tool in addition to said first hand.

* * * * *